B. B. HOLMES.
AUXILIARY CUSHION FOR AUTOMOBILES.
APPLICATION FILED MAR. 5, 1921.
1,405,215.
Patented Jan. 31, 1922.
2 SHEETS—SHEET 2.
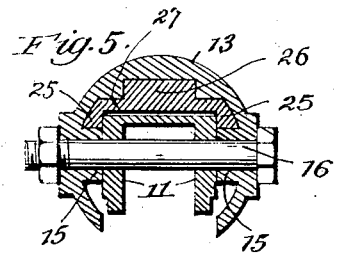
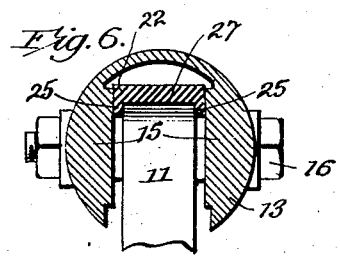
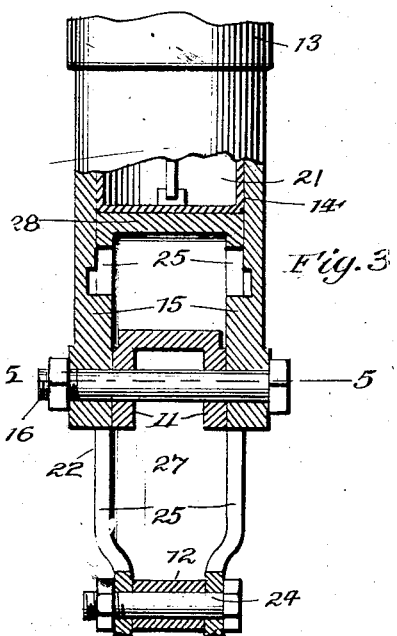
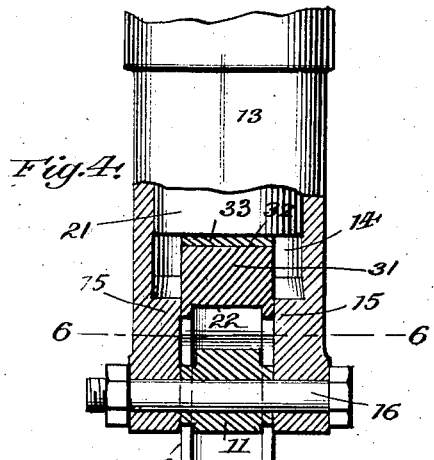
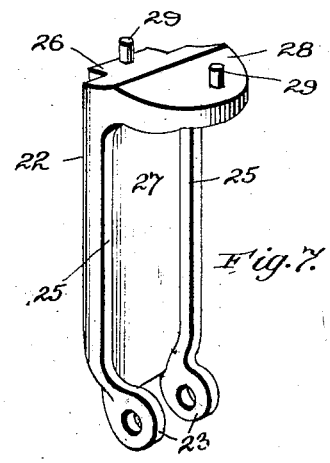
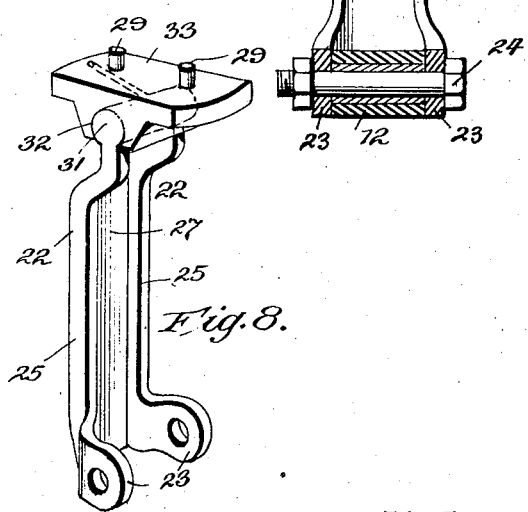
Inventor
Bradford B. Holmes
By Dodge and Sons
Attorneys

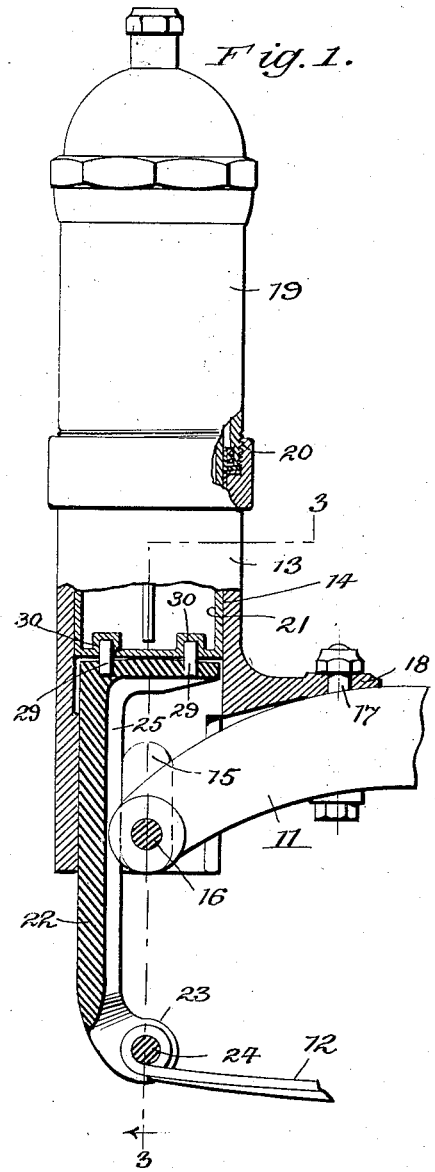
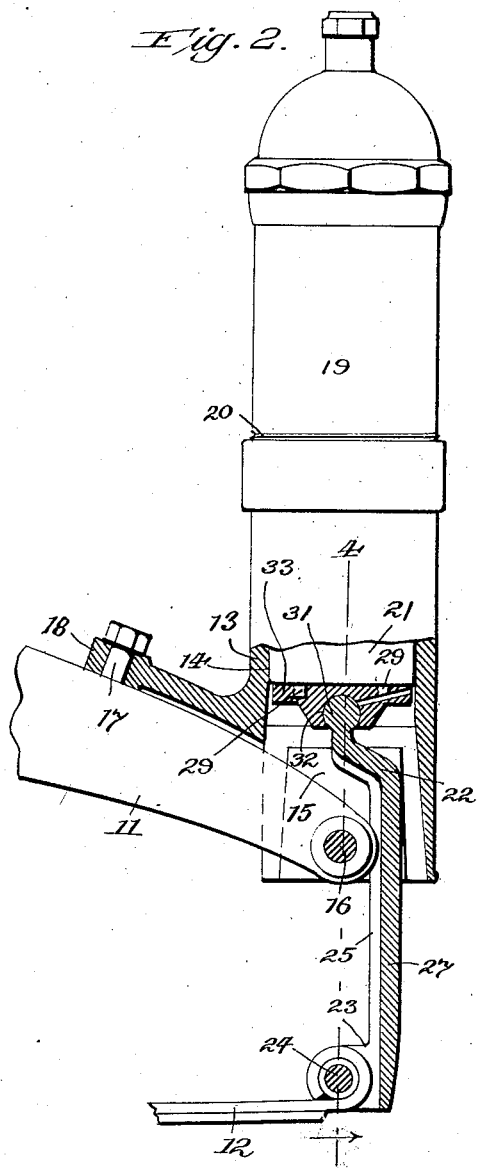

UNITED STATES PATENT OFFICE.

BRADFORD B. HOLMES, OF NEW YORK, N. Y.

AUXILIARY CUSHION FOR AUTOMOBILES.

1,405,215.   Specification of Letters Patent.   Patented Jan. 31, 1922.

Application filed March 5, 1921. Serial No. 449,783.

*To all whom it may concern:*

Be it known that I, BRADFORD B. HOLMES, a citizen of the United States, residing at New York, in the county of New York and State of New York, have invented certain new and useful Improvements in Auxiliary Cushions for Automobiles, of which the following is a specification.

This invention relates to auxiliary cushions for automobiles and particularly to means for connecting upright plunger cushions, of either the pneumatic or metallic spring type to the ordinary leaf springs of standard automobile chassis.

The invention resides in certain features of the base member for the cushion, and of the thrust member interposed between the cushion plunger and the leaf spring. These features are conducive to simplicity of construction, ease in assembling, and precision of guiding of the thrust member.

The invention offers its greatest advantage when used with a cushion of the type in which the entire cushion structure, including the plunger, is removable as a unit from or through the top of the base casting. Such a cushion is described and claimed in my co-pending application Serial No. 436,263, filed January 10, 1921, and accordingly the claims of the present application are restricted by the specific inclusion of the thrust structure and are not drawn broadly to a cushion of that type. The present invention offers advantages with other types of cushion, familiar to those skilled in the art; and hence I do not limit myself in this respect except in specifically limited claims.

In the accompanying drawings I illustrate the present invention as applied to cushions of the type forming the subject-matter of my prior application, above identified, the cushion structure being shown only with sufficient detail to permit the present invention and its advantages to be fully understood. I show the invention as applied to the front end of the front spring and rear end of the rear spring of the standard type of automobile semi-elliptic spring suspension, but the invention may be otherwise applied.

In the drawings:

Fig. 1 is a side view partly sectional of my invention as applied to the front end of a front semi-elliptic spring. This is a typical example of installation requiring the thrust member to have a simple right line movement.

Fig. 2 is a similar view showing the invention as applied to the rear end of a rear semi-elliptic spring. This is a typical example of installations requiring the thrust member to have a compound movement.

Fig. 3 is a section on the line 3—3 of Fig. 1.
Fig. 4 is a section on the line 4—4 of Fig. 2.
Fig. 5 is a section on the line 5—5 of Fig. 3.
Fig. 6 is a section on the line 6—6 of Fig. 4.
Fig. 7 is a perspective view of the thrust member shown in Figs. 1, 3 and 5.
Fig. 8 is a perspective view of the thrust member shown in Figs. 2, 4 and 6.

As will be observed, Figs. 1, 3, 5 and 7 illustrate a specifically different embodiment of the invention from Figs. 2, 4, 6 and 8, to the extent that the thrust member illustrated in the latter figures is intended to have an appreciable swinging movement. All semi-elliptic springs require a swinging link at one end, to allow for the variation of the distance between shackle bolts as the spring flexes. This swinging link is always placed at the rear end of the spring according to present standard practise. Whenever the auxiliary cushion is placed at the rear end of a semi-elliptic spring of the present standard type the thrust member merely takes the place of the conventional swinging link, and hence is of the form shown in Figs. 2, 4, 6 and 8. On the other hand, when the auxiliary cushion is placed at the front end of a semi-elliptic spring of the present standard type, the conventional swinging link remains at the rear end of the semi-elliptic spring, and it is therefore necessary to confine the front end of the spring to substantially right line movement. This result is accomplished by the use of the thrust member illustrated in Figs. 1, 3, 5 and 7, which has simple right-line movement. Figs. 1 and 2 therefore illustrate the front and rear cushion installations applied according to my present invention to a standard semi-elliptic spring suspension.

Referring first to Figs. 1, 3, 5 and 7, the front spring horn of a conventional chassis is shown at 11 and the forward end of the front semi-elliptic spring at 12. Mounted on the horn 11 is a base member 13 formed with a vertical cylindrical guide passage 14 in its upper end.

The guide passage 14 is wider than the end of horn 11, but bosses 15 are provided to confine the sides of horn 11 so that a bolt 16 passing through these bosses and through the ordinary shackle-bolt holes in spring horn 11, and a bolt 17 passing through extension 18 and the top flange of horn 11 hold the base member 13 rigidly in position. I prefer so to design the parts that the center lines of bolt 16 and guideway 14 intersect but this is not essential.

The cushion structure is preferably a unitary device housed in a cap 19 which is threaded at 20 to base 13. This cushion structure includes a cup-shaped plunger 21 projecting downward from cap 19 and guided in guide-way 14, the plunger 21 being removable with cap 19. This structure is susceptible of many embodiments, but so far as illustrated, follows the disclosure of my prior application above identified. In any case the plunger 21 is urged resiliently downward from cap 19 and acts in conjunction with spring 12.

A thrust member 22 having inwardly offset ears 23 at its lower end transmits the thrust of spring plunger 21 to the steel spring 12. These ears 23 straddle the end of spring 12 and are connected thereto by a bolt 24. Above the ears 23 the member 22 is of the section shown best in Figs. 5 and 7, i. e., it has edge flanges 25 and a central guide rib 26 both carried in an offset web 27 and passing clear of horn 11. At the upper end of member 22 is a crowned or rocker-like bearer plate 28 which seats against the lower end of plunger 21, but is not affixed thereto.

The crown formation of plate 28 permits the parts to assume their alinement individually and prevents binding. I prefer to provide plate 28 with projecting dowel pins 29 which enter recesses 30 in the lower end of plunger 21 and prevent relative rotation of these parts.

The bosses 15 bear against the flanges 25 of member 22 and rib 26 slides in a groove formed in base 13 to receive it. This assures a vertical right line sliding movement of member 22.

The first assembling operation is to insert member 22 downward through guide-way 14 of member 13. The inwardly offset ears 22 pass clear of bosses 15. The base 13 is then mounted on horn 11 after which the bolt 24 is inserted. Then, with the chassis properly jacked up the cap 19 and its contained cushion may be screwed to place. This construction is applicable in the form shown, or in slightly modified forms, to almost any existing chassis of the semi-elliptic spring type.

Referring to Figs. 2, 4, 6 and 8, a rear spring horn is shown at 11 and the rear end of a semi-elliptic spring at 12. The base member 13 is similar to that previously described, having a cylindrical guide-way 14 and bosses 15. The bosses 15 are however of slightly different form designed to offer wide side bearing surfaces to the thrust member. The parts 16, 17, 18, 19, 20 and 21 are essentially the same in form and function as similarly numbered parts already described. The thrust member 22 is specifically different in form. The ears 23 are outwardly offset, but are connected as before described to leaf spring 12 by means of bolt 24. The body of the thrust member 22 consists of flanges 25 and web 27, but the member 22 is not confined by base member 13 except through lateral bearing against bosses 15, which, as before stated are enlarged to afford a substantial area of lateral contact. The upper end of the member 22 is offset and terminates in a cylindrical head 31 which engages in a seat 32 formed in the lower face of bearer block 33. The seat 32 is undercut and the parts are engaged by sliding the cylindrical head 31 axially into undercut seat 32. The bearer block 33 is provided with dowels 29 identical in form and function with the dowels 29, previously described.

It will be observed upon examination of Fig. 4 that bearer block 33 is flattened at its sides so as to pass between bosses 15. It is held in position by dowels 29.

In assembling this form of the device member 22 and block 33 are first connected and then inserted upward through guide-way 14 of base member 13. Base member 13 is then mounted in horn 11, bolt 24 is inserted, and after jacking up the frame cap 19 and its contained cushion may be screwed to place.

These two specifically different embodiments of the invention have certain important features in common; i. e. the strut members are guided by the base casting, are retained by the insertion of bolt 16 and are not affixed to the plunger. The cushion plunger is not subjected to lateral stress by deflection of the thrust member incident to any tendency of leaf springs 12 to move laterally with respect to spring horns 11. The strut links and the guides provided therefor in the base members 13 resist these stresses. In each embodiment, the plunger and strut member are free to aline themselves thus guarding against cramping, and allowing sufficient flexibility to assure that the device may be manufactured by ordinary commercial methods and yet function satisfactorily when applied to existing cars manufactured without thought of its future application. The dowel pins 29 prevent rotation of the cushion plunger, a feature which is useful with cushions whose parts are screwed together and might tend to unscrew if free to turn.

The removability of the entire cushion structure with the cap 19 is a convenient feature in conjunction with the independent thrust members. This detail is not however essential. The cushion may be of the pneumatic, or of the coil spring type or some combination of the two.

What I claim is:—

1. In a vehicle, the combination, with a spring horn and a leaf spring, of a base member mounted on said spring horn and provided with guides; a thrust member connected with said leaf spring and confined by said guides to a right line movement; and a cushion device mounted on said base member and having an independently guided plunger in thrust relation with said thrust member.

2. In a vehicle, the combination with a spring horn and a leaf spring, of a base member mounted on said spring horn and provided with guides; a thrust member connected with said leaf spring and confined by said guides to right line movement; a cushion device mounted on said base member and having an independently guided plunger; and thrust engagement means acting between said plunger and thrust member and serving to localize the thrust substantially through the axis of said plunger, while permitting the plunger and thrust elements to assume independent alinements.

3. In a vehicle, the combination with a spring horn and a leaf spring, of a base member mounted on said spring horn and provided with guides; a thrust member connected with said leaf spring and laterally confined by said guides; and a cushion device mounted on said base member and having an independently guided plunger in thrust relation with said thrust member.

4. In a vehicle, the combination with a spring horn and a leaf spring, of a base member mounted on said spring horn and provided with guides; a thrust member connected with said leaf spring and laterally confined by said guides; a cushion device mounted on said base member and having an independently guided plunger; and thrust engagement means acting between said plunger and thrust member and serving to localize the thrust substantially through the axis of said plunger while permitting the plunger to assume its own alinement.

5. In a vehicle, the combination, with a spring horn and a leaf spring, of a base member mounted on said spring horn and provided with guides; a thrust member connected with said leaf spring and confined by said guides to a right line movement; a cushion device mounted on said base member and having an independently guided plunger in thrust relation with said thrust member; and interengaging means serving to prevent rotation of said plunger relatively to said thrust member.

6. In a vehicle, the combination with a spring horn and a leaf spring, of a base member mounted on said spring horn and provided with guides; a thrust member connected with said leaf spring and laterally confined by said guides; a cushion device mounted on said base member and having an independently guided plunger in thrust relation with said thrust member; and interengaging means serving to prevent rotation of said plunger relatively to said thrust member.

7. The combination with a vehicle frame including a spring horn provided with the usual shackle bolt hole; of a leaf spring; a base member provided with guides; a bolt passing through said base member and said shackle bolt hole and serving to secure said base member to said horn; a thrust member guided by said guides, connected with said leaf spring and offset to pass clear of said bolt; and a cushion mounted in said base member and including an individually guided plunger in thrust relation with said thrust member.

8. The combination with a vehicle frame including a spring horn provided with the usual shackle bolt hole; of a leaf spring; a base member provided with guides; a bolt passing through said base member and said shackle bolt hole and serving to secure said base member to said horn; a thrust member guided by said guides, connected with said leaf spring and offset to pass clear of said bolt; and a cushion mounted on said base member and including an individually guided plunger in thrust relation with said thrust member, said cushion and plunger being removable from said base member while said thrust member remains assembled with the latter.

In testimony whereof I have signed my name to this specification.

BRADFORD B. HOLMES.